United States Patent [19]

Dawkins et al.

[11] Patent Number: 5,625,841

[45] Date of Patent: Apr. 29, 1997

[54] DATA PROCESSING SYSTEM

[75] Inventors: John Dawkins, Long Itchington; Gary G. Wooding, Leamington Spa, both of England; Robert W. Baird, Calgary, Canada; Richard A. Moore, Emsworth Portsmouth, England

[73] Assignee: International Business Machines Corporation, Armonk, N.Y.

[21] Appl. No.: 230,192

[22] Filed: Apr. 20, 1994

[51] Int. Cl.⁶ ............................................. G06F 11/00
[52] U.S. Cl. .................. 395/835; 364/264; 364/246.6; 395/483
[58] Field of Search .................. 395/800, 425, 395/483, 497.01, 828, 835, 836; 340/825.06; 364/DIG. 1, 264, 246.6

[56] References Cited

U.S. PATENT DOCUMENTS

| | | | |
|---|---|---|---|
| 4,825,406 | 4/1989 | Bean | 395/425 |
| 4,827,411 | 5/1989 | Arrowood | 395/600 |
| 5,049,873 | 9/1991 | Robins | 340/825.06 |
| 5,197,143 | 3/1993 | Lary | 395/425 |
| 5,276,789 | 1/1994 | Besaw | 395/140 |
| 5,388,243 | 2/1995 | Glider | 395/425 |

Primary Examiner—Eric Coleman
Attorney, Agent, or Firm—Edward Duffield; Duke W. Yee; Andrew J. Dillon

[57] ABSTRACT

The invention relates to a method and apparatus for the maintenance of a data processing system. A topology map of the physical connections of direct access storage devices of storage subsystems is created. This map enables the system to keep track of the physical configuration of DASDs and their control units, especially in the case of interconnected processor complexes. According to an embodiment of the invention, the topology map also includes desired status data and other information data about the DASDs. This data is used in the monitoring of the DASDs to determine deviations from desired operating characteristics.

10 Claims, 3 Drawing Sheets

DATA PROCESSING SYSTEM

BACKGROUND OF THE INVENTION

1. Technical Field

The present invention relates to the maintenance of a data processing system. More particularly the present invention relates to a method for determining the topology (or structure) of a storage subsystem of a data processing system, monitoring the status of the subsystem and automatically responding to perturbations in the subsystem.

2. Description of the Related Art

The management of storage devices and sets of data on large data processing systems and mainframe computers is a known problem. Most large computer systems have a hierarchy of storage devices ranging from magnetic tape cartridge data storage devices which have slow access time to direct access storage devices (DASD), which have a relatively fast access time. Typically, the hardware configuration of computer systems is constantly undergoing change i.e. new DASDs may be introduced and others removed or replaced. In the case of interconnected systems, arrangements as to whether particular DASDs are shared between processors may also be subject to change. Also, restrictions may be imposed to limit the sharing of DASDs subject to certain conditions being met. DASDs may be shared between processors to save disk space or when they are being used to store a program library.

An example of an interconnected data processing system is shown in FIG. 1. The central computer system 10A is connected to remote target computer systems 10B and 10C. The computer systems 10A, 10B and 10C have associated direct access storage device (DASD) storage, i.e. DASDs 30A, 30B and 30C are associated with the processor of 10A via I/O controller 40A. DASDs 30D, 30E, 30F and 30C are associated with the processor of 10B via I/O controller 40B. DASD 30C is shared between processor 10A and 10C. In such a system both 10A and 10B may be aware that DASD 30C is shareable but, neither processor can determine the identity of the other processor.

Each DASD has a unique serial number or physical identifier associated with it. This physical identifier is not actually utilized by the processor but is used by service engineers as an address for locating the physical position of a DASD for the purpose of replacing it or performing maintenance on it. The processor communicates with storage space on a DASD by means of a logical address. The actual physical positions and physical connections of DASDs are not known by the processor.

As data processing systems are expanded and modified there is a problem in recording and keeping track of the physical configuration of the direct access storage devices and their control units, especially in the case of interconnected processor complexes. Prior art methods of keeping track of DASDs tend to be quite primitive and involve a great deal of human interaction and manual typing of data.

SUMMARY OF THE INVENTION

Viewed from one aspect the present invention provides a method for managing a data processing system including determining the topology of a storage subsystem of the data processing system by the steps of: reading identification data representing a processor of the data processing system; reading identification data representing an I/O controller associated with the processor; reading identification data representing a storage element of the storage subsystem associated with the I/O controller and processor; storing the identification data in a database; and repeating each of the reading steps and storing step for each storage element of the storage subsystem of the data processing system thereby producing a topology database from which the data processing system may identify the physical connections of a storage element of the storage subsystem.

Viewed from another aspect the present invention provides a data processing system including: one or more processors; at least one storage subsystem associated with each respective processor; an I/O controller associated with each respective processor for controlling data transfer between the processor and associated storage subsystems; means for reading identification data representing one of the processors; means for reading identification data representing an I/O controller associated with the processor; means for reading identification data representing an element of one of the subsystems associated with the processor; means for storing the identification data in a topology database whereby the data processing system may identify the physical connections of a storage element of the storage subsystem.

The present invention addresses the needs of storage administrators and operators to control and manage the storage subsystems effectively and efficiently. Typically, operators are re-active and respond to out-of-line situations in real-time, whereas storage administrators are pro-active and need to monitor the storage subsystem to detect trends and predict the need to upgrade and reconfigure. Operators issue commands to make temporary changes to running systems whereas storage administrators use batch jobs to gather data and make lasting changes.

The above as well as additional objects, features, and advantages of the present invention will become apparent in the following detailed written description.

BRIEF DESCRIPTION OF THE DRAWINGS

In order that the invention may be fully understood preferred embodiments thereof will now be described, by way of example only, with reference to the accompanying drawings wherein.

DETAILED DESCRIPTION OF PREFERRED EMBODIMENT

The present invention is applicable to a single processor (either a uniprocessor or a multiprocessor) or two or more intercommunicating processor complexes. It is also applicable to two or more processor complexes that share one or more direct access storage devices with non-removable media and/or control units for DASD devices with non-removable media. In accordance with the preferred embodiment of the invention, the operating system controlling the complex or complexes is the IBM Multiple Virtual Storage (MVS) operating system produced by International Business Machines Corporation. However any other operating system which provides error or status records similar to the Environmental Record Editing and Printing Program (EREP)

records of MVS for the purpose of hardware service provision may be utilized. The MVS operating system (or control program) is responsible for controlling use of system resources such as DASD and other I/O devices. An example of such DASDs are the 3390 DASDs produced by International Business Machines Corporation.

Referring again to FIG. 1, a central computer system 10A, such as the IBM 3090 computer system is attached by communication lines 20 to local or remote target computer systems 10B and 10C. Most mainframe operating systems, an example being the Multiple Virtual Storage (MVS) operating system, monitor every attached I/O device and record error data on a System Error Recording Data Set (ERDS).

Figure 1:
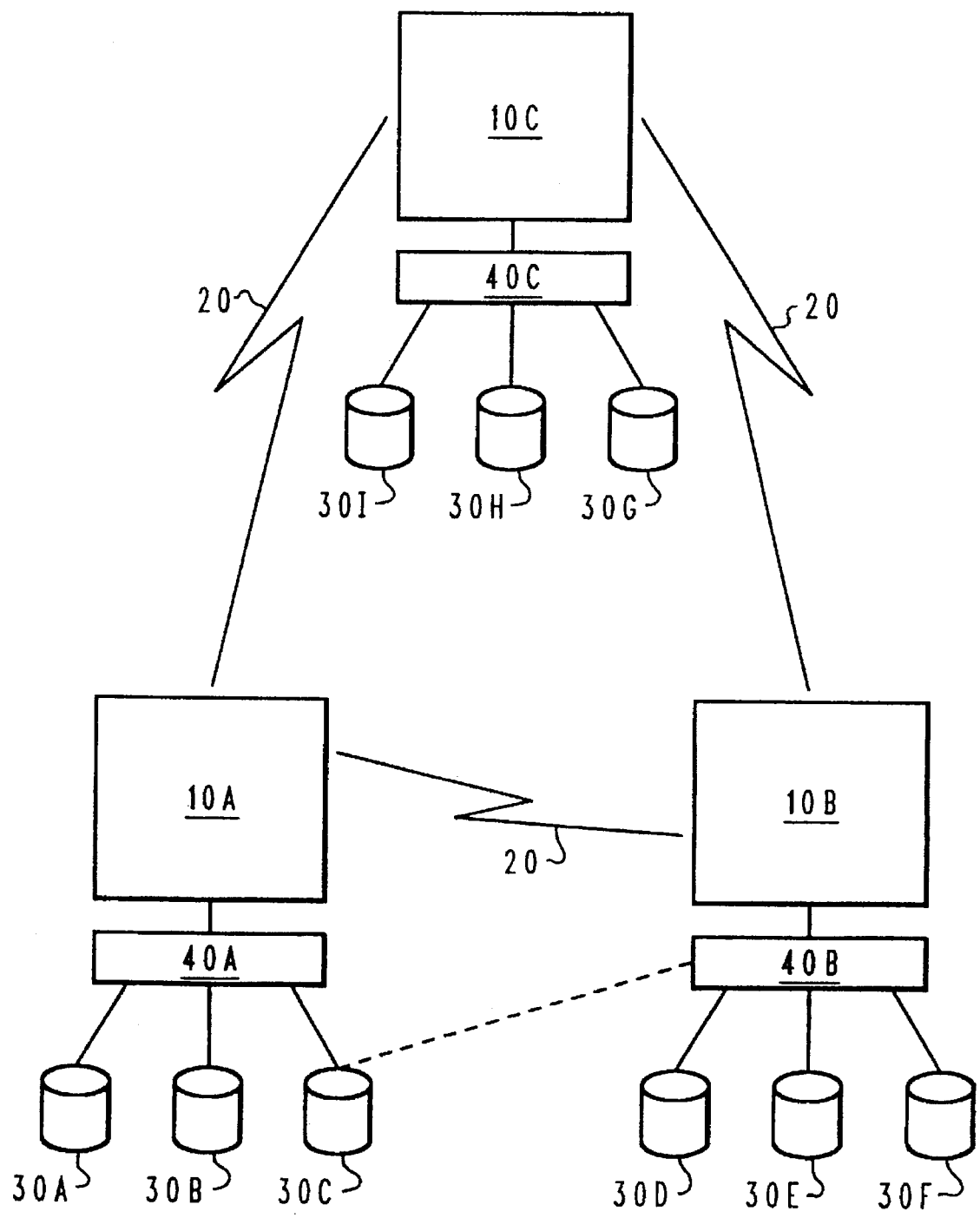
FIG. 1 shows a block diagram of three interconnected data processing systems.
Figure 2:
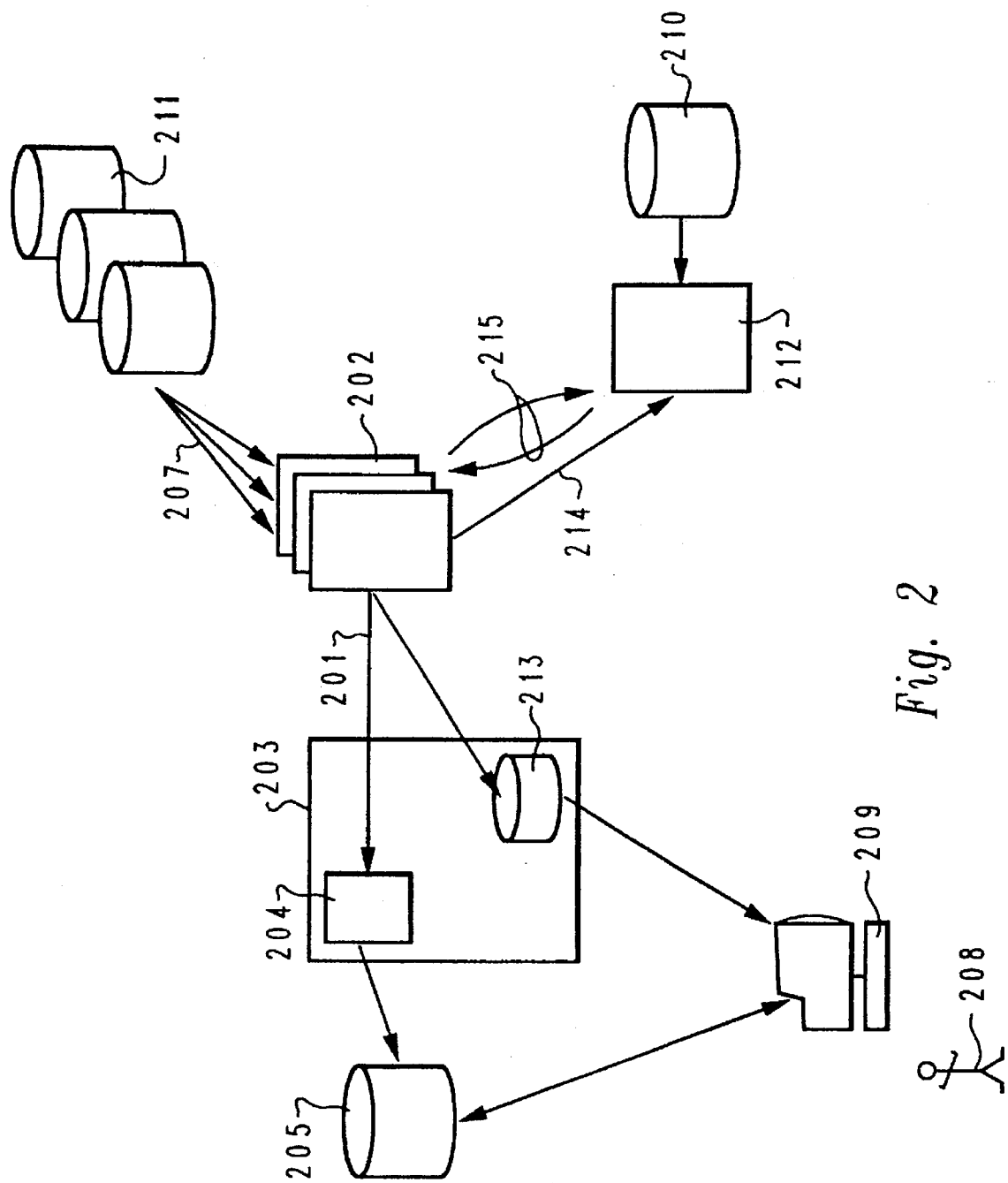
FIG. 2 shows a block diagram of data processing system, such as the one shown in FIG. 1, operating in accordance with the present invention.

FIG. 2 shows the operation of a computer system in accordance with the present invention. The central system shown as 10A in FIG. 1 corresponds to the central system 204 of FIG. 2 and the target systems 10B and 10C correspond to target systems 202. DASDs 30A to 301 of FIG. 1 are shown at 211 in FIG. 2. The ERDS data includes the I/O device sense bytes which are intended to assist service engineers in diagnosing errors and identifying failing components. This data is sent 201 from the target system or systems 202 as a stream to the central system 203. In accordance with the present invention a data analysis program 204 exploits the device identification data contained in the ERDS data streams by using it to automatically build a system model 205. This model is both descriptive and normative. It:

1. Describes the central and target systems, the storage devices or DASDs 211 connected to them and the physical connection paths 207 themselves.

2. Contains information regarding the desired status of the storage devices and connection paths. This information is supplied by a storage administrator 208 working at a display station 209.

Copies of the system model 205 are transmitted over the communication lines to reside on the target systems at storage device or DASD 210. Monitoring programs 212 on the target systems perform the following functions:

1. Submit requests for status data 215 to their local systems and compare the results with the local copy of the system model. If discrepancies are detected, the following actions occur:
   a. Exception data is sent to the central system to be stored in an exception file 213 which can be displayed on the administrator's display station 209.
   b. Corrective action is taken to attempt to rectify the discrepancy. This may involve submitting commands or jobs to the local target system and monitoring the results.

2. Detect certain system error messages 214 raised during the normal operation of the target system. When detected, perform action (a) and (b) above as appropriate.

The steps taken in building the system model of the topology of a data processing system will now be described:

STEP 1: Collect data for the processor group. Each volume of DASD can be connected to one or more control units, and each control unit can be connected to one or more processors. Each DASD volume, each control unit and each processor has a unique physical identifier that is recorded in the ERDS sense data.

STEP 2: Process data for the processor group to create a hierarchical database. The first level of the database refers to a processor, the second level refers to a control unit or I/O controller and the third level refers to a volume of DASD.

Figure 3:
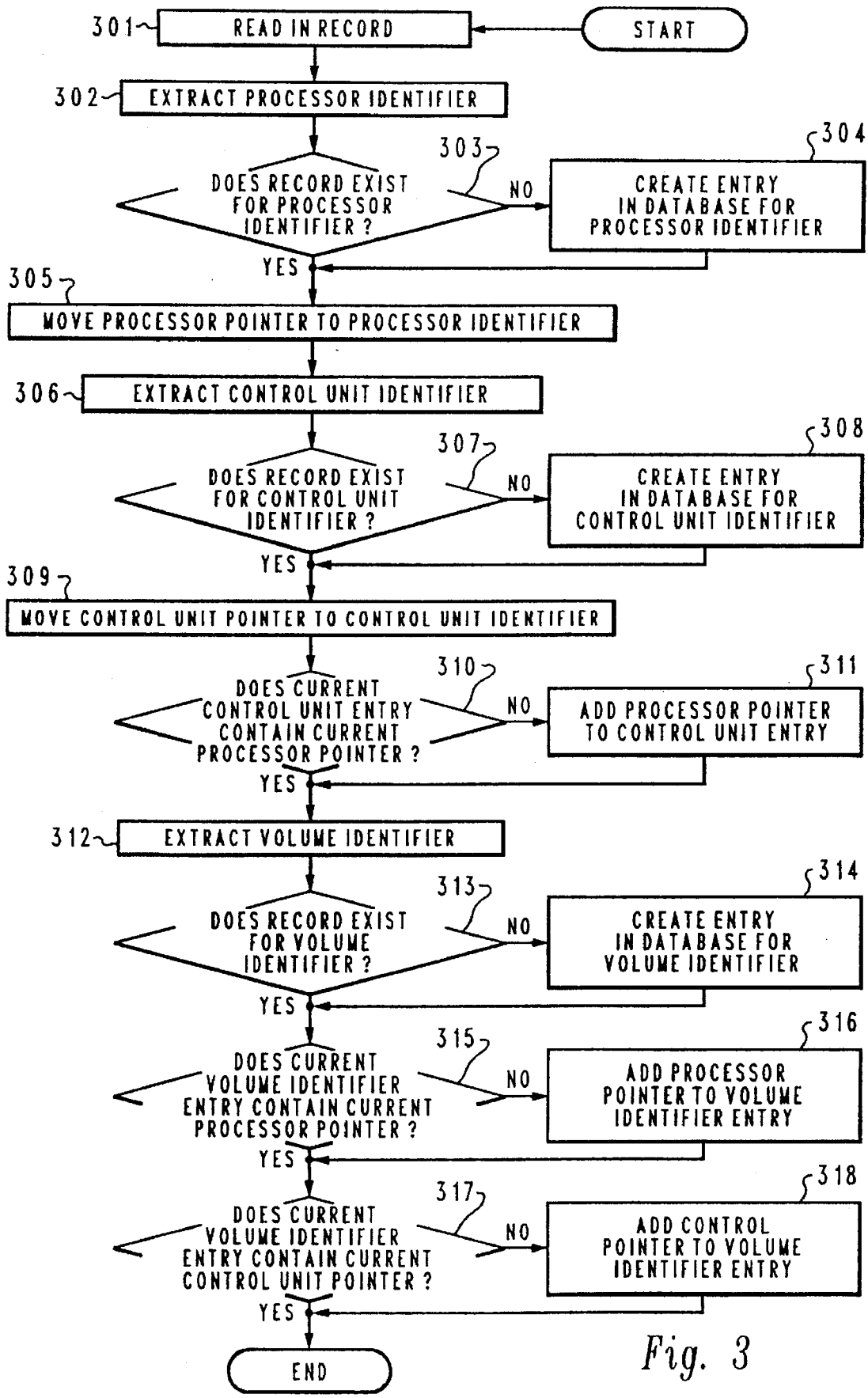
FIG. 3 shows a flow diagram of the steps taken when a topology database is created in accordance with the present invention.

A more detailed description of the database creation is shown in FIG. 3. At step 301, data containing information about a DASD volume is read into the central processor, shown at 203 in FIG. 2, from the System Error Recording Data Set (ERDS). Data representing the processor identifier is extracted from the ERDS record at step 302, then a check is made at step 303 to see if an entry for this processor already exists in the database. If an entry does not exist, then one is created at step 304. A pointer to this processor entry is then saved, making it the current processor entry at step 305. At step 306, the control unit identifier is extracted from the ERDS record, and at step 307 a check is made to see if an entry for this control unit already exists in the database. An appropriate entry is made at step 308 if one does not already exist. A pointer to this control unit entry is then saved, making it the current control unit entry at step 309.

At step 310, the current control unit entry is checked to see if it contains the current processor pointer. If it does not, the current processor pointer is added to the control unit entry at step 311. At step 312, the DASD unit identifier is extracted from the ERDS record, and at step 313, a check is made to see if an entry for this DASD unit already exists in the database. An appropriate entry is made at step 314 if one does not already exist. At step 315, the current DASD unit entry is checked to see if it contains the current processor pointer. If it does not, the current processor pointer is added to the DASD unit entry at step 316. At step 317, the current DASD unit entry is checked to see if it contains the current control unit pointer. If it does not, the current control unit pointer is added to the DASD unit entry at step 318. This process is repeated for each record in the ERDS and, on completion, the database contains entries for each processor, control unit and DASD unit in the system, together with details of the connection topology.

The newly created database is preferably stored on disk as three separate files, one for the processor identifier, one for the control unit identifier and one for the volume identifier. In accordance with a preferred embodiment of the present invention, this database of the topology of the complete system is utilized to store additional information. Additional fields are created relating to the status of the system. The desired status of individual DASD volumes in the system is input to the database manually and checks can be run continuously or on command to ascertain the current operating status of an individual DASD.

Further, additional fields may be created. Such fields may relate to the fastwrite status of a DASD device. When the operating system of a data processing system issues a command for data to be written to a DASD, the data is normally first written to a cache memory, which generally has the fastest access time of the hierarchy of data storage devices of a computer system, then transferred to DASD in time. The fastwrite status field indicates whether a data set is currently stored in cache memory or in DASD or whether it is being transferred between the two. There also may be an additional field, indicating the connection status of a DASD device i.e. whether it is on or off.

The topology database is read by the analysis program (indicated at 204 in FIG. 2), which can issue commands to the operating system. In this way, the operating system can determine which DASD or other I/O devices are attached and can detect when their operating characteristics deviate from the desired characteristics. The operating system can then issue commands to change the characteristics of I/O devices which have deviated. The steps taken by the analysis program are as follows:

1. Read position data and desired operating status, or characteristic data, for a device from topology database.

2. Issue operating system commands to determine current operating status of device.

3. Compare desired status with actual status.

4. Log any discrepancies.

5. Issue further operating system commands to correct the discrepancies.

Preferably, only those discrepancies which cannot be corrected by the operating system, are notified to the operators and system administrators. In accordance with a preferred embodiment of the present invention, all commands are logged so that an audit trail is available in case of unexpected results or problems.

While the invention has been particularly shown and described with reference to a preferred embodiment, it will be understood by those skilled in the art that various changes in form and detail may be made therein without departing from the spirit and scope of the invention.

What is claimed is:

1. A method for managing a data processing system including determining the topology of a storage subsystem of the data processing system, the method comprising the steps of:

reading identification data representing a processor of the data processing system;

reading identification data representing an I/O controller associated with the processor;

reading identification data representing a storage element of the storage subsystem associated with the I/O controller and processor;

storing the identification data in a database; and repeating each of the reading steps and storing step for each storage element of the storage subsystem of the data processing system, wherein a topology database is produced from which the data processing system may identify the physical connections of a storage element of the storage subsystem;

creating a plurality of status fields in the topology database, wherein a status field from the plurality of status fields is associated with each storage element;

storing desired operating characteristics into the plurality of status fields, wherein the desired operating characteristics includes desired operating characteristics for a storage element;

monitoring the actual operating characteristics of the storage element;

comparing the actual operating characteristics with the desired characteristics from the topology database; and signaling the data processing. System if any discrepancies exist between the desired operating characteristics and the actual operating characteristics of the storage element.

2. The method for managing a data processing system as claimed in claim 1, wherein the system includes more than one processor, each processor having an associated I/O controller and associated storage subsystem.

3. The method for managing a data processing system as claimed in claim 2, wherein each storage element of the storage subsystem is a direct access storage device.

4. The method for managing a data processing system as claimed in claim 1, wherein the system includes more than one processor, each processor having an associated I/O controller and associated storage subsystem.

5. A method for managing a data processing system as claimed in claim 4, wherein each storage element of the storage subsystem is a direct access storage device.

6. The method for managing a data processing system as claimed in claim 1, wherein each storage element of:the storage subsystem is a direct access storage device.

7. The method of claim 1, further comprising issuing commands to change the characteristics of a storage element which has deviated from the desired operating characteristics.

8. The method for managing a data processing system as claimed in claim 1, wherein each storage element of the storage subsystem is a direct access storage device.

9. A data processing system comprising:

one or more processors;

at least one storage subsystem associated with each respective processor;

an I/O controller associated with each respective processor for controlling data transfer between the processor and associated storage subsystems;

means for reading identification data representing one of the processors;

means for reading identification data representing an I/O controller associated with the processor;

means for reading identification data representing an element of one of the subsystems associated with the processor;

means for storing the identification data in a topology database, wherein the data processing system may identify the physical connections of a storage element of the storage subsystem;

creation means for creating a plurality of status fields in the topology database, wherein a status field within the plurality of status fields is associated with each storage element;

storage means for storing desired operating characteristics into the plurality of status fields, wherein the desired operating characteristics includes desired operating characteristics for a storage element;

monitor means for monitoring the actual operating characteristics of the storage element;

comparison means for comparing the actual operating characteristics with the desired characteristics from the topology database; and signaling means for signaling the data processing system if any discrepancies exist between the desired operating characteristics and the actual operating characteristics of the storage element.

10. The method of claim 9, further comprising issue means for issuing commands changing the characteristics of a storage element which has deviated from the desired operating characteristics.

* * * * *

UNITED STATES PATENT AND TRADEMARK OFFICE
CERTIFICATE OF CORRECTION

PATENT NO. : 5,625,841
DATED : April 29, 1997
INVENTOR(S) : J. Dawkins et al

It is certified that error appears in the above—identified patent and that said Letters Patent is hereby corrected as shown below:

Claim 1, col 5, line 50, change "processing.System" to -- processing system --.

Signed and Sealed this

Twenty-sixth Day of August, 1997

Attest:

BRUCE LEHMAN

Attesting Officer          Commissioner of Patents and Trademarks